(12) United States Patent
Merkel

(10) Patent No.: US 11,599,076 B2
(45) Date of Patent: Mar. 7, 2023

(54) METHOD FOR SYNCHRONIZATION, METHOD FOR OPERATING AN INDUSTRIAL SYSTEM, APPARATUS, COMPUTER-READABLE MEDIUM

(71) Applicant: Siemens Aktiengesellschaft, Munich (DE)

(72) Inventor: Matthias Merkel, Landau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 129 days.

(21) Appl. No.: 17/263,996

(22) PCT Filed: Jul. 29, 2019

(86) PCT No.: PCT/EP2019/070319
§ 371 (c)(1),
(2) Date: Jan. 28, 2021

(87) PCT Pub. No.: WO2020/025521
PCT Pub. Date: Feb. 6, 2020

(65) Prior Publication Data
US 2021/0294286 A1    Sep. 23, 2021

(30) Foreign Application Priority Data

Aug. 2, 2018  (EP) .................................... 18187026

(51) Int. Cl.
*G05B 17/02* (2006.01)
*G05B 19/05* (2006.01)
(52) U.S. Cl.
CPC ............. *G05B 17/02* (2013.01); *G05B 19/05* (2013.01); *G05B 2219/13186* (2013.01); *G05B 2219/163* (2013.01)

(58) Field of Classification Search
CPC ................... G05B 17/02; G05B 19/05; G05B 2219/13186; G05B 2219/163; G05B 19/042; Y02P 90/02
See application file for complete search history.

(56) References Cited

U.S. PATENT DOCUMENTS

| 4,831,549 | A | 5/1989 | Red et al. |
| 6,144,897 | A | 11/2000 | Selliers |
| 2019/0179271 | A1* | 6/2019 | Modi .................. G05B 13/048 |

FOREIGN PATENT DOCUMENTS

| DE | 102016222732 |  | 5/2018 |
| DE | 102016222732 | A1 * | 5/2018 |

(Continued)

OTHER PUBLICATIONS

Heinzerling Till et al: "Gerätemodelle in Prozesssimulation integrieren", ATP EDITION, vol. 59, No. 10, pp. 34, 2017.

(Continued)

*Primary Examiner* — Chad G Erdman
(74) *Attorney, Agent, or Firm* — Cozen O'Connor

(57) ABSTRACT

A method for operating an industrial system, an apparatus, a computer program product, a computer-readable medium and method for synchronizing a system model with a real system, wherein a) a system model including at least one device model configured to calculate simulated output values and/or state values from simulated input values using mathematical functions and which is expanded with at least one mathematical function inverse to the at least one mathematical function is provided, b) at least one real output value and/or state value is provided, c) the at least one real output value and/or state value is supplied to the expanded device model, d) via the functions, at least one input value is back-calculated from the at least one real output value and/or state value, and e) the at least one back-calculated (Continued)

input value and/or a derived value is used to synchronize the system model with the real system.

13 Claims, 5 Drawing Sheets

(56) References Cited

FOREIGN PATENT DOCUMENTS

| | | | |
|---|---|---|---|
| EP | 0301527 | | 2/1989 |
| JP | H06161510 A | * | 6/1994 |
| WO | 9938054 | | 7/1999 |

OTHER PUBLICATIONS

PCT International Search Report dated Oct. 17, 2019 based on PCT/EP2019/070319 filed Jul. 29, 2019.

* cited by examiner

METHOD FOR SYNCHRONIZATION, METHOD FOR OPERATING AN INDUSTRIAL SYSTEM, APPARATUS, COMPUTER-READABLE MEDIUM

CROSS-REFERENCE TO RELATED APPLICATIONS

This is a U.S. national stage of application No. PCT/EP2019/070319 filed 29 Jul. 2019. Priority is claimed on European Application No. 18187026.2 filed 2 Aug. 2018, the content of which is incorporated herein by reference in its entirety.

BACKGROUND OF THE INVENTION

1. Field of the Invention

The invention relates to a method for operating an industrial system, an apparatus, a computer program product, a computer-readable medium and to a method for synchronizing a system model used to simulate a real industrial system with a real industrial system.

2. Description of the Related Art

In industrial systems, such as process plants, process values for monitoring and control purposes can be obtained via measuring points on and/or in system components such as tanks or pipework. This measurement consists of the respective measuring setup, the measuring principle and the field device used, which usually comprises at least one sensor and measuring transmitter.

For automation, particularly for automatic control and/or monitoring of the processes running on industrial systems, automation devices or systems are used which can take the form of programmable logic controllers (PLCs), for example.

During operation, process variables acquired via field devices are cyclically transferred to the controller and the process is cyclically influenced by transmitting manipulated variable values determined by the controller to the system's actuators. The manipulated variable values are determined based on, or taking into account, acquired process variables.

It is desirable to be able to plan, install and commission the automation equipment of an industrial system with a high degree of quality in the shortest possible time. At least partial simulation of the automated industrial system has proved to be advantageous in this respect.

The use of simulation models is of major importance in the area of digitization. The Applicant is aware that such models are also being increasingly used in the operational phase of the system life cycle and that new applications are being developed. For example, real-time and look-ahead simulation can be used for optimization purposes or also as assistance systems.

These simulation systems allow modeling of entire process plants and dynamic simulation of the plant in real time. In particular, models can be used that comprise a plurality of submodels. For example, the automation system and the control logic can be emulated using a SoftPLC (e.g., per VDI/VDE 3693), the operation of the field devices can be simulated by device models and the process behavior by a process simulation. Device models are used to simulate the behavior and functionality of the real, physical field devices.

A suitable simulation tool for industrial systems is known, for example, from "SIMIT: Simulation and Virtual Commissioning" of the Applicant, which is described, for example, in the "Siemens STPCS7T" catalog, April 2013, in particular pages 4/2 to 4/6, and in the ST PCS 7 T catalog, 2018 edition, entitled "SIMATIC PCS 7 Process Control System Volume 2: Technology Components", in particular in Chapter 08 "Simulation and Training Systems".

For the SIMIT simulation tool there is, for example, the SITRANS and SIPART device library which contains both generic and detailed device models. An overview of the device library can be found in the documentation entitled "SITRANS and SIPART Device Library for SIMIT SP". The device library is also described in the article "Integrating Device Models in Process Simulations" by T. Heinzerling, M. Oppelt, T. Bell, ATP Edition Volume 59 No. 10 (2017), pages 34 to 45.

Regarding simulations, the term "digital twin" of the system or, in the case of the submodels in the form of device models, the term digital twins of the devices is also used.

The basis or prerequisite for being able to achieve the aforementioned advantages via simulations is, in particular, a sufficiently accurate representation of the simulating system (simulation model of the real system) in a simulation tool and, above all, the synchronization between the simulation model and the real system or plant.

A return flow of values from the real system into the simulation model can be used to attempt to achieve a convergence of simulation and reality. However, such an alignment currently still involves considerable time and effort with much manual input and is difficult, if not impossible, to accomplish with sufficient accuracy.

SUMMARY OF THE INVENTION

In view of the foregoing, it is therefore an object of the present invention to create the possibility of enabling an industrial system to be simulated as reliably as possible.

This and other objects and advantages are achieved in accordance with the invention by a method for synchronizing a system model used to simulate a real industrial system with a real industrial system, wherein the method comprises:

a) providing a system model comprising at least one device model that simulates or can simulate the operation of a real device of the real industrial system, wherein, using one or more mathematical functions, the at least one device model is configured to calculate simulated output values, which particularly represent real output values of the at least one real device, and/or simulated state values, which particularly represent real state values of the real industrial system, from simulated input values which in particular represent real input values for the at least one real device, and where the at least one device model is extended to include one or more mathematical functions that are the inverse of the one or more mathematical functions, b) providing at least one real output and/or state value originating from the operation of the real industrial system, c) supplying the at least one real output and/or state value to the extended device model, d) utilizing the one or more inverse mathematical functions, at least one input value is back-calculated from the at least one real output and/or state value, and e) the at least one back-calculated input value and/or at least one value derived therefrom is used to synchronize the system model with the real system.

In other words, the present invention is based on the idea of enhancing device models of a simulation model for an industrial system such that it becomes possible to back-calculate input values, e.g., sensor and/or manipulated variable values, based on real process values, in particular of an automation system of the industrial system, and to use these values to synchronize the simulated real industrial system with the real industrial system. This makes use of the fact that the existing, unextended device models simulate the mode of operation, scaling, normalization, or filtering, and thus the effect of the real devices. The effect of the device input value(s) on output values, or particularly in the case of actuators, on resulting state value(s), is thus known, and by applying one or more inverse functions, one or more output or state values obtained from the system and pertaining to a particular system state can be inferred back to one or more input values, such as sensor and/or manipulated variable values.

The input value(s) can be used to determine and specify the state of the at least one device, particularly if the measuring principle is known.

The measuring principle is to be understood as the way the measurement is performed. For example, a (hydrostatic) level measurement (e.g., using a manometer) of a tank constituting a system component can be performed at the height of the tank bottom. Then, for example, a sensor can be connected to the tank via a nozzle. The sensor converts the pressure present, which can be an absolute or relative pressure, into an electrical signal depending on parameters such as the position of the measuring point (offset). The electrical signal is converted by a measuring transmitter into a desired output variable, e.g., a liquid level in percent, depending on additional parameters and is available as an analog value in the process image of the inputs (PII) of a programmable logic controller as a process value and represents the (fill) state of the tank at the current point in time.

The at least one device can be a system component or a process unit, for example.

In step b), one or more real output or status values that were acquired on the real system are advantageously provided.

It should be noted that, in a per se known manner, simulated input or output/state values that represent real input or output/state values for the at least one real device do not need to be identical to real input or output/state values. Rather, there can be deviations that may be due to the fact that there is an acceptable deviation between the real system component and the model (in particular per VDI/VDE 3693) and the measured value from the model is subject to a tolerable error. Simulated input and output values are usually values that are used as placeholders or representatives for corresponding real values according to a given simulation model.

It should be noted that the order of the steps of the method according to the invention, in particular steps a) and b), can also be different, e.g., steps a) and b) are interchangeable.

With particular preference, it is provided that one or more extended device models are used within the scope of the invention, where the extension then enables back-calculation from output or state values to input values. In particular, the extension is therefore constituted by or includes one or more inverse functions. The inverse function(s) is/are the inverse of the function(s) of the device model, i.e., of the function(s) via which, for the simulation of the (complete) device function, output or rather resulting state values, each corresponding or equating to real input and output/state values of the real device or the real system, can be calculated from input values. It can also be provided that the states or state transitions of one or more actuators at a given point in time are derived from the inputs and outputs (PII and PIQ) of an in particular programmable logic controller using one or more inverse functions of an extended actuator device model and are applied to an extended device model to initialize the device model at that point in time.

A function $f^{-1}$ that is the inverse of a function f is to be understood as particularly meaning a function $f^{-1}$ for which $f*f^{-1}=1$. In addition, it may be the case that a function that is the inverse of a function f: A→B which assigns a uniquely determined element b from the set B (b∈B) to each element a from a set A (a∈A) is given by the function $f\_1$: B-A, which assigns an element a from the set A (a∈A) to each element b from the set B (b∈B).

It has been found particularly suitable to provide, as output or state value(s), at least part of the process image of the inputs (PII) and/or at least part of the process image of the outputs (PIQ) of an in particular programmable logic controller of the real system. If, for example, the process image of the inputs or a part thereof is made known, e.g., in a simulation tool such as SIMIT, input values such as sensor values of one or more transmitters and/or manipulated variable values of one or more actuators of the system can be back-calculated in the inventive manner.

The present invention makes it possible for the first time to align a simulated system with a real system in a given operating state accurately and with acceptable time and effort. The time and effort involved is considerably reduced compared to manual alignment. Faithful, accurate alignment is possible with acceptable time and effort. As a result, simulation models of the system simulation from, e.g., virtual commissioning or an operator training system can also be reused for operation-parallel simulation and initialized with the state of the real system.

An industrial system usually comprises a plethora of devices, such as a large number of sensors and/or actuators and/or transmitters. An associated system model that is used to simulate the system and its operation may then also comprise a plurality of device models. Self-evidently real output or state values can then also be provided for a plurality of, preferably all the device models and these values can be calculated back using inverse functions and the back-calculated values can be used for alignment purposes.

Correspondingly, in a further embodiment of the method in accordance with the invention, the system comprises a plurality of devices and in step a) a system model is provided which comprises a device model for a plurality of, in particular all the real devices of the system, which simulates or can simulate the operation of the respective real device of the system, wherein, using one or more mathematical functions, the respective device model is configured to calculate simulated output values that particularly represent real output values of the at least one real device, and/or simulated state values that particularly represent real state values of the system, from simulated input values that particularly represent real input values for the at least one real device, and where the respective device model is extended to include one or more mathematical functions that are the inverse of the function or functions of the respective device model, and in step b) at least one real output and/or state value originating from operation of the real system is provided, in step c) the respective at least one real output and/or state value is supplied to the respective extended device model, in step d) at least one back-calculated input value is calculated from the respective at least one real output and/or state value via the one or more inverse mathematical functions of the respective extended device model, and in step e) back-calculated input values and/or values derived therefrom are used to synchronize the system model with the real system.

As a further embodiment, at least one extended device model is constituted by or includes a transmitter device model which is configured to simulate the operation of a transmitter of the real system that particularly processes real input values into real output values.

The one or more inverse functions particularly represent an extension of the at least one transmitter device model or are part of an extension thereof.

It can also be provided that at least one transmitter device model comprises one or more mathematical functions via which at least one simulated transmitter output value representing a real transmitter output value of the real system is calculated or can be calculated from at least one simulated sensor value constituting a transmitter input value that represents a real sensor value of a real sensor of the real system.

Output values of transmitters can be constituted by process values, for example. Process values are preferably at least part of the process image of the inputs (PII), particularly of a real (programmable logic) controller of the real system. The effect of a transmitter from sensor value (input of the transmitter) to process value (output of the transmitter, particularly PII) is known by the model and can be back-calculated from a process image of the inputs of a real system, the image particularly corresponding to the real output of a real transmitter of the real system, to sensor values via inventive inversion or back-calculation using associated inverse functions.

If at least one extended device model is an extended transmitter device model and if one or more sensor values are back-calculated using it, then this or these values are preferably fed to the system model for synchronization.

The back-calculation principle can of course be used not only for transmitters of sensors but also for other devices/components and associated input and output values. Another example are actuators.

Accordingly, it can be provided that at least one extended device model is constituted by or includes an actuator device model which is configured to simulate the operation of an actuator of the real system. The at least one actuator device model preferably comprises one or more mathematical functions via which at least one state value representing a real state value of the real system is or can be calculated from at least one simulated actuator input value representing a real actuator input value, in particular at least one value of the process image of the outputs of a preferably programmable controller of the system.

An actuator device model extended in accordance with the invention then comprises one or more mathematical functions that are the inverse of this/these mathematical function(s).

With the one or more inverse function(s), manipulated variable values representing input values can then be back-calculated from real state values and these can be used to synchronize the system model and the real system.

If the system model provided comprises at least one actuator device model, it can also be provided that in step b) at least one value of the process image of the outputs of a real, in particular programmable controller of the real system and at least one value of the process image of the inputs of a real, in particular programmable controller of the real system are provided, and preferably in step d) using the inverse mathematical function or functions of the extended actuator device model at least one actuator input value is back-calculated from the at least one value of the process image of the inputs and preferably compared with the at least one value of the process image of the inputs of the real, in particular programmable logic controller of the real system. With particular preference, in the event of a deviation, alignment can then be brought about in order to achieve synchronization.

An actuator of a system can be formed as a valve or a pump, for example. An input value can be, e.g., a manipulated variable value that in particular can constitute part of the process image of the outputs of a (programmable) logic controller. An actuator is preferably one with feedback, which in particular provides or can provide feedback about an actual state attained as a result of at least one received manipulated variable value. One or more feedback values that represent state values then constitute in particular part of the process image of the inputs (PII) of a preferably programmable logic controller of the system. An associated actuator device model is then implemented or set up accordingly.

Particularly in the case that in step a) a system model with at least one actuator device model is provided, in step b) preferably at least part of the process image of the inputs (PII) and at least part of the process image of the outputs (PIQ) of a real, in particular programmable logic controller of the real system is provided. Actuators and associated actuator device models usually map the functionality in particular for control and monitoring in a state machine. If a system component is in a state such as "pump off", for example, or in a state transition such "pump/motor starts", for example, then the state transition having the targeted state, e.g., "the pump shall deliver at a specific rate" or "the pump/motor shall run at a specific speed and in a specific direction (forward)" is derived from the combination of the command (PIQ) and the feedback (PII), and the simulation can be synchronized taking this into account.

If, at the time of alignment, the real system or more specifically its system components are in a stationary state, then alignment in accordance with the present invention can be achieved in a particularly simple manner by providing one or more output values, in particular process values of the PII of a controller. In the case of a non-stationary system phase, sequences, in particular of output values, can be used to detect and take into account a change or progression over time.

In an advantageous embodiment of the method in accordance with the invention, during step b), a plurality of real output values are provided, where in particular at least one sequence of a plurality of real output values acquired at consecutive points in time is provided.

If synchronization is to occur at a point in time when a system is in a non-stationary state, then the use of at least one extended actuator device model is also particularly suitable, since a transient state can be derived from the comparison of desired to real (PIQ to PII).

In another embodiment, using at least one assignment table and/or characteristic curve, at least one correspondence value is assigned to the at least one back-calculated input value calculated in step d) and the at least one correspondence value is used as a derived value in step e). By using one or more assignment tables and/or one or more characteristic curves, the specific effects of the simulation components of the measuring principle can be taken into account or determined.

The adoption of one or more back-calculated input values and/or values derived therefrom can be realized by simple scripting in an existing simulation tool, such as SIMIT. In addition, it can be provided that the time constants (memory) of the device models are set to zero for fast adoption of values and—in the case of a what-if analysis—are reset to their actual value. Filter constants can produce signal smoothing of inputs, e.g., sensor, values. This can mean that the output signal follows the input signal with a certain time delay. If the filter constant is set to zero, then this means that the output signal follows the input signal without any delay.

It is also an object of the present invention to provide a method for operating an industrial system, where a system model used to simulate the system is provided and the system model is synchronized with the industrial system by performing the synchronization method in accordance with the disclosed embodiments of the invention, and the industrial system is operated taking into account the synchronized system model. A synchronized system model can be useful, for example, for generating particular backup points (so-called "snapshots"). Backup points can be transferred and loaded at a given time in the same or a similar system located elsewhere, e.g., to train certain scenarios (OTS) or to repeatedly test alternative modes of operation of a system ("what-if analysis").

It is also and object of the invention to provide an apparatus that is configured to perform the method in accordance with the disclosed embodiments of the invention for synchronization or the method in accordance with the disclosed embodiments of the invention for operating an industrial system.

In particular, the apparatus may comprise at least one computing device, such as a PC, or be constituted by such a computer. If at least one computing device is present, then it preferably has at least one processor and/or main memory and/or storage medium. A system model having at least one extended device model can then be provided on a computing device of the apparatus in accordance with the invention. The apparatus in accordance with the invention can also form part of the industrial system to be simulated or part of an automation system of such an industrial system. In order to provide the at least one real output value of the at least one real device, the value originating from the operation of the real system, the apparatus in accordance with the invention or at least a part of it can be connected, via cable and/or wirelessly, to a control system, such as a programmable logic controller of an industrial system to be simulated. For the connection, the apparatus in accordance with the invention can have one or more interfaces. It is also possible for the apparatus in accordance with the invention to be incorporated in or constituted by a control system, such as a programmable logic controller of an industrial system. If the apparatus is formed separately from an in particular programmable logic controller, then the controller preferably has a suitable interface via which at least one real output or state value, in particular at least one value of the PII and/or PIQ, can be obtained and supplied to the separate apparatus. Such an interface can be, e.g., an Ethernet interface with open/standardized (OPC UA) OPC protocol.

In addition, it is also an object of the invention to provide a computer program product comprising program code instructions for performing the steps of the method in accordance with the disclosed embodiments of the invention for synchronization or the method in accordance with the disclosed embodiments of the invention for operating an industrial system.

Lastly, it is also an object of the invention to provide a non-transitory computer-readable medium comprising program instructions which, when executed by at least one processor of at least one computer, cause the at least one computer to perform the steps of the method in accordance with the disclosed embodiments of the invention for synchronization or the method in accordance with disclosed embodiments of the invention for operating an industrial system.

The computer-readable medium can be a CD-ROM or DVD or a USB or flash memory, for example. It should be noted that a computer-readable medium is not to be understood exclusively as a physical medium, but such a medium may also be present, for example in the form of a data stream and/or a signal representing a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages will become clear from the following description of an exemplary embodiment of the invention with reference to the accompanying drawings, in which.

DETAILED DESCRIPTION OF THE EXEMPLARY EMBODIMENTS

Figure 1:
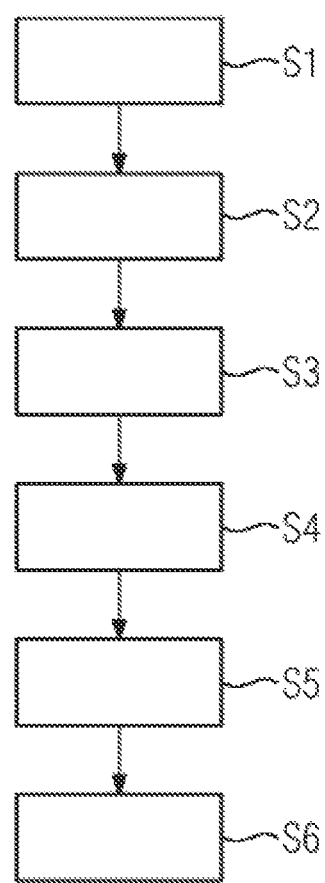
FIG. 1 shows an exemplary embodiment of method for operating a real industrial system in accordance with the invention.

FIG. 1 shows the steps of an exemplary embodiment of a method for operating a real industrial system in accordance with the invention. This includes the steps of an exemplary embodiment of a method for synchronizing a system model used to simulate the real industrial system with the real system in accordance with the invention, specifically the steps S1 to S6.

Figure 2:
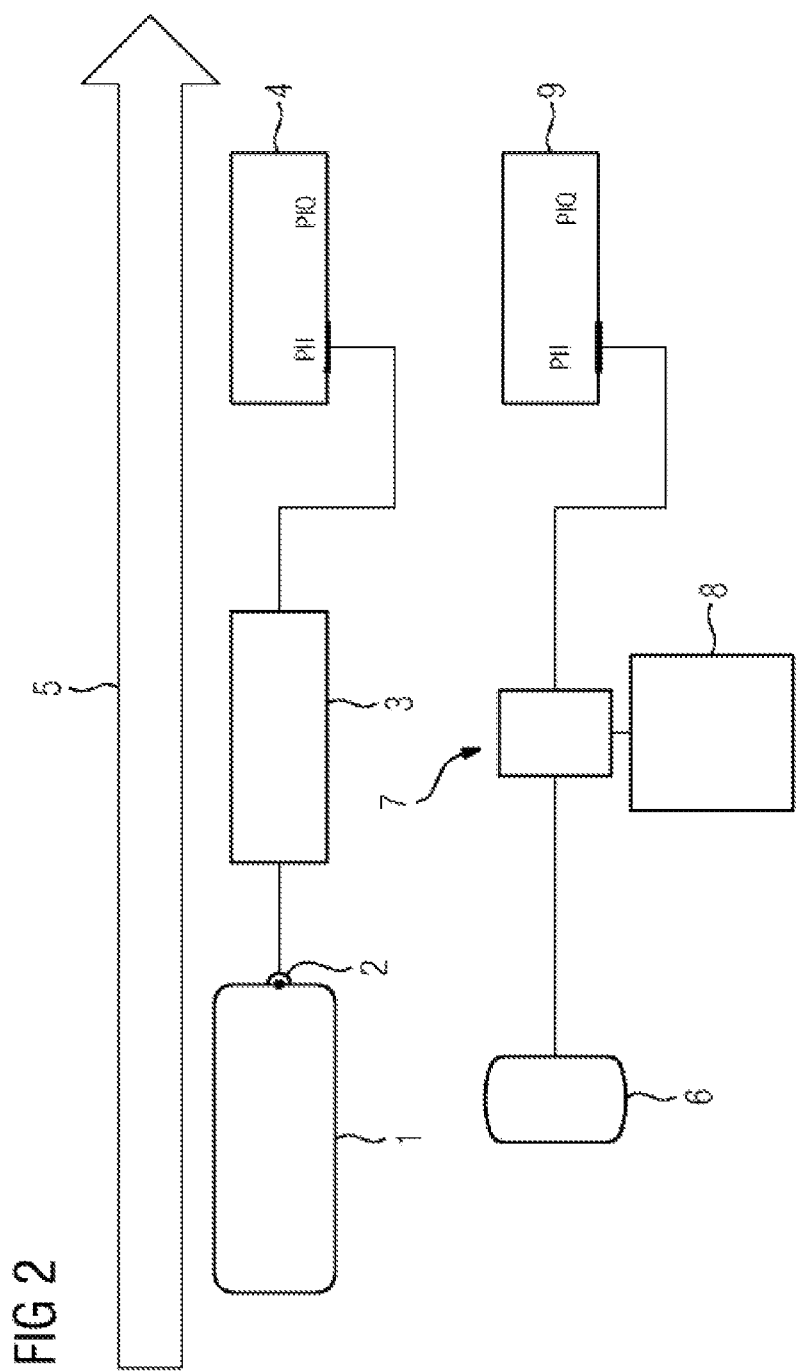
FIG. 2 schematically shows components of an industrial system together with corresponding submodels of an associated system model in accordance with the invention.

Parts of the real industrial system are shown schematically in FIG. 2. Illustrated here is a process plant for research purposes. This is not to be taken in a limiting sense. Rather, an inventive method for synchronization and an inventive method for operating a system can self-evidently also be applied to any other systems serving other purposes.

Here, the system comprises a reactor tank 1 upon which is mounted a sensor 2 for measuring the current liquid level in the tank 1, a field device in the form of a transmitter 3 that is connected to the sensor 2 and receives or can receive sensor values acquired by the sensor 2 during operation and determines or can determine process values therefrom, and a programmable logic controller (PLC) 4 that is connected to the transmitter 3 and that receives or can receive process values cyclically from the transmitter 3 during operation which the transmitter 3 has determined from received sensor values. The transmitter 3 smooths sensor values and performs preprocessing, in particular puts them into a form that the PLC 4 can "read" or further process. The sensor values received from the sensor 2 represent input values of the transmitter 3 and the processed sensor values, which can be termed process values, are output values thereof.

Process values that the PLC 4 has received from the transmitter 3 form part of the "process image" of the inputs (PII).

An arrow 5 in FIG. 2 indicates the path or direction from the system component, i.e., the reactor tank 1, via the sensor 2 and the transmitter 3, to the automation system, in particular the PLC 4.

In this example, the transmitter 3 is a SITRANS P DS III PA which is marketed by the Applicant. Self-evidently, other transmitters can also be used. The sensor 2 is a sensor incorporated in the transmitter.

As an alternative to using a field device with PROFIBUS PA, one with a different communication standard, e.g., HART, can of course also be used.

It should be noted that in addition to the components shown in FIG. 2, the system comprises a number of other components, including additional sensors 2 and transmitters 3, as well as actuators that are also connected to the PLC 4 and can be used to influence the process.

During operation, process variables acquired via the system's sensors 2 are cyclically transferred to the PLC 4 and the process is cyclically influenced by transferring manipulated variable values determined by the PLC 4 to actuators of the system. The manipulated variable values are determined based on or taking into account acquired process variables.

The system and its operation are simulated, here. For this purpose, a system model is used which that created using the Applicant's simulation tool "SIMIT SP V9.1". The system model comprises a plurality of submodels, specifically a process simulation 6 for the process occurring in the storage or reactor tank 1, a generic device model 7 that replicates the interface to the sensor 2, a detailed device model 8 for the transmitter 3, and an emulation for the PLC 4 which is here constituted by a SoftPLC 9.

Generic device models from the SIMIT device library contain basic functions particularly of actuators and sensors that are not type-specific and can be used for most field devices. The detailed device models have been developed specifically for simulating particular devices. The detailed device models extend the generic models to include special functions and can be used together with them. The generic and detailed models are interconnected via a special interface.

The device models each comprise (in a per se known manner) one or more mathematical functions that are used to represent the operation or effect of the respective device. As far as the transmitter device model 8 is concerned, one or more mathematical functions are specifically provided which can be used to calculate simulated output values, which, in the case of the transmitter model 8, comprise simulated process values to be transferred to the SoftPLC 9, from simulated input values which, in the case of the transmitter model 8, comprise simulated sensor values. The simulated process values to be transferred to the SoftPLC 9 represent part of the simulated PII. The one or more mathematical functions of the transmitter device model 8 are used to map the mode of operation, scaling, normalization, filtering, etc., specifically the complete effect of the device.

The simulated sensor values correspond to or represent real sensor values of the real sensor 2 and the simulated output values, i.e., process values, correspond to real output/process values of the real transmitter 3 which form part of the real PII.

In FIG. 2, the models 6, 7, 8, 9 that are associated with the components 1, 2, 3, 4 of the system are each illustrated below them by image elements that represent the models in purely schematic form.

If the components and processes of a system are known, then an associated system model can be created using a simulation tool such as SIMIT. However, the challenge is to align the system model with a real system that is in a given operating state. The present invention creates a possibility for achieving this alignment.

Specifically, in a first step S1 (cf. FIG. 1) a system model is provided, which includes an extended detailed device model 10 associated with the transmitter 3. The extension 11 of the model 10 comprises one or more mathematical functions that form the inverse of the mathematical function (s) of the detailed device model 8 for the transmitter 3. A function that is the inverse of a function f: A→B which assigns a uniquely determined element b∈B to each a∈A is to be understood as the function $f^{-1}$: B→A that assigns an a∈A) to each b∈B.

The system model with the extended device model 10 is provided on a PC (not shown in the figures) or on an ESX Server system which is connected to the real PLC 4 via a cable (also not shown).

In a step S2, a real output value of the real transmitter 3 is provided, which has been transferred from the real transmitter 3 to the real PLC 4 and which constitutes a process value and part of the real PII of the real PLC 4.

The output value can be, for example, a level and/or a pressure and/or a volume and/or mass flow measurement or a value representing one of these values.

Figure 3:
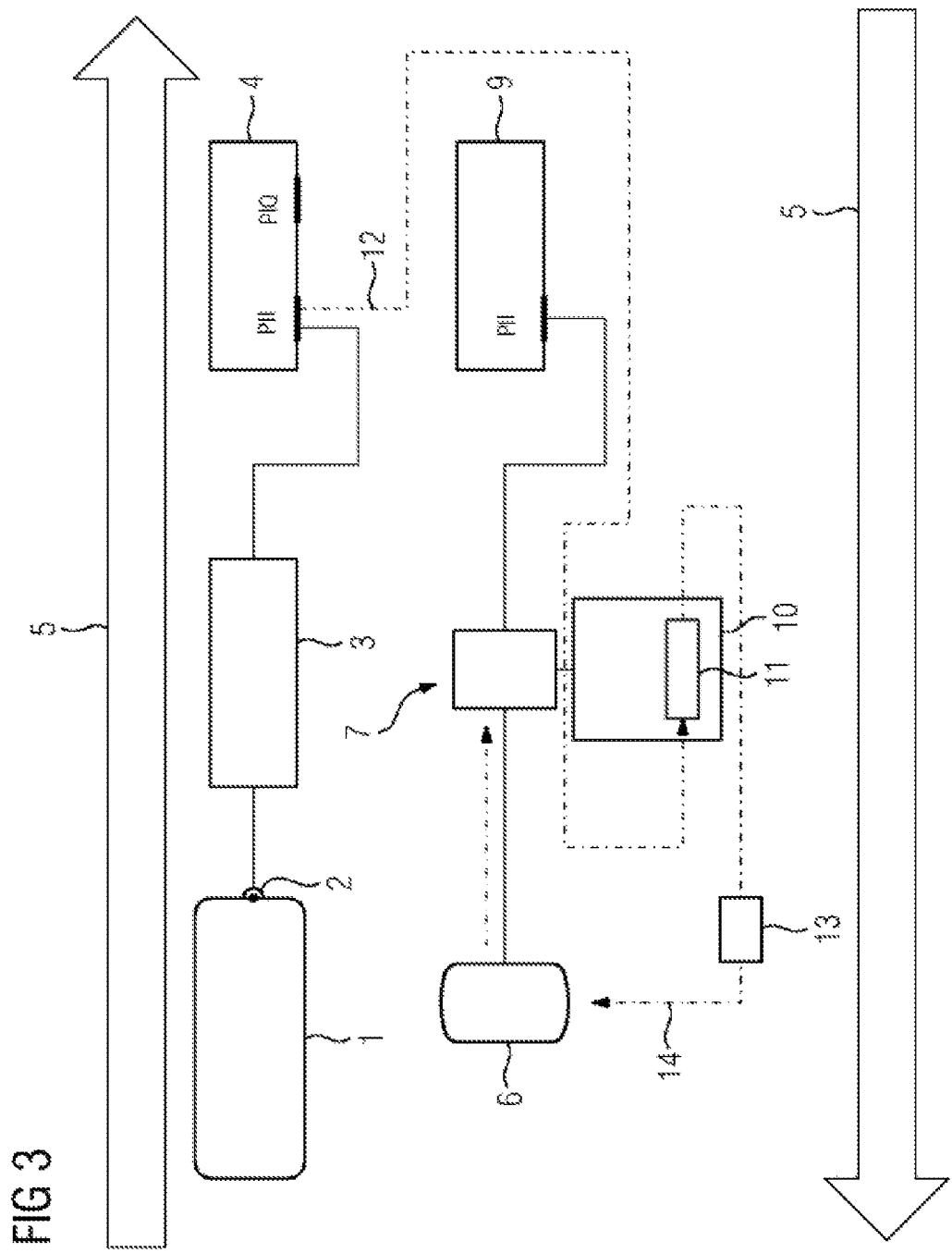
FIG. 3 shows the components and models from FIG. 2, where the transmitter device model is constituted by an transmitter device model extended in accordance with the invention.

In a step S3, the real process value is supplied to the extended device model 10. Specifically, the real output value is transferred from the PLC 4 to the PC having the system model. In FIG. 3, this is indicated by a dash-dotted arrow 12 from the PII of the real PLC 4 to the extended device model 10. This process or function can also be called "PII REFEED" or "PII feedback".

In a step S4, the extended device model 10 calculates a back-calculated input value from the real process value, specifically a back-calculated sensor value. The calculation is performed using the one or more inverse mathematical functions that constitute an extension 11 of the device model 10.

If, for example, an exemplary analog process value PV_analog can be calculated from an input value InPV via (at least) one function f of a device model using $$PV\_analog = InPV * f$$

then $$InPV = PV\_analog * f^{-1}$$

can be used to back-calculate an input value from a real process value PV_analog.

In step S5, a correspondence value, which is a sensor value here, is assigned to the back-calculated input value using an assignment table. Depending on the system component and measuring principle, e.g., in the case of a tank and a pressure-based level measurement, then the sensor value corresponds to a physical quantity (e.g., in mbar) which possibly cannot be directly applied to the component model. The state of the component model can be set, for example, via a liquid-level-in-meters parameter. Specific effects of the simulation components of the measuring principle can be taken into account or determined via an assignment table. Alternatively or in addition to an assignment table, at least one characteristic curve can be accessed.

In FIG. 3 the process of assigning a correspondence value is indicated by a block element labeled with the reference character 13. The block element 13 is on a dash-dotted arrow 14 going from the extended device model 10 to the process simulation 6 and indicating the corresponding transfer of the sensor value or rather the assigned correspondence value.

In step S6 the correspondence value obtained using the assignment table is supplied to the system model to synchronize it with the real system.

The opposite direction to the conventional procedure from the automation system, i.e., the PLC 4 via the device models 7, 10 to the simulated system component, is indicated in FIG. 3 by another arrow 5 at the bottom of the figure.

Following synchronization, simulated values are transferred to the device model 7 from the process simulation 6, indicated in FIG. 3 by a dash-dotted arrow going from the process simulation 6 to the model 7.

In addition to the sensor 2 and transmitter 3 shown in FIG. 3, the system model includes yet more devices and, for the other real devices, the associated model has yet more device models that include one or more mathematical functions via which the total device effect can be calculated and which likewise are or can be augmented by one or more inverse mathematical functions.

The above-described steps in connection with the transmitter 3 and the corresponding extended model 10 can then be performed similarly for one or more other, with particular preference all the devices of the system and all the back-calculated input values can be used for synchronization.

The method in accordance with the invention is by no means limited to sensors or transmitters associated with sensors. Rather, it can also be used for other devices, such as actuators or flowmeters.

Figure 4:
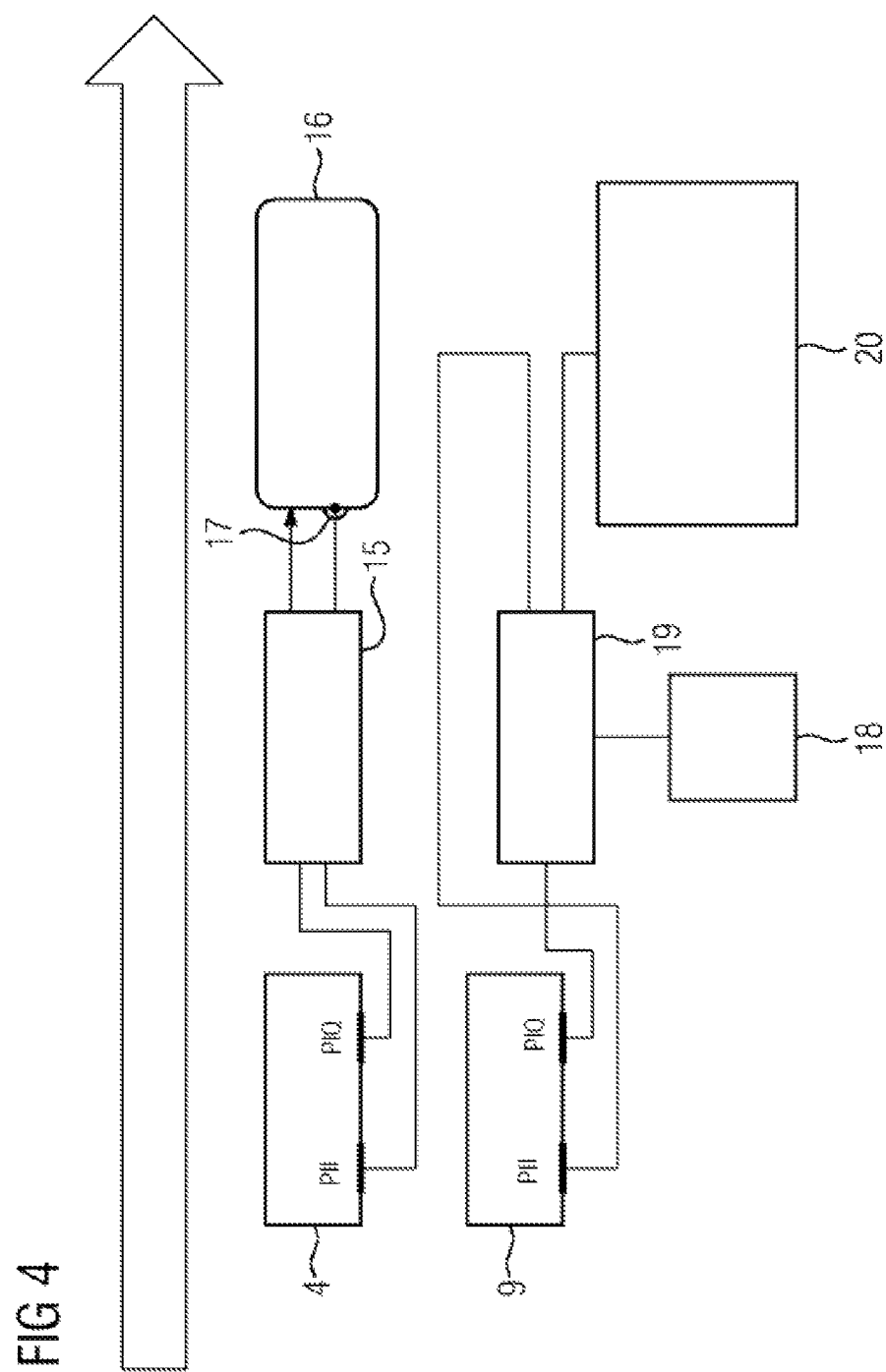
FIG. 4 schematically shows components of an industrial system together with corresponding submodels of an associated system model in accordance with the invention.

FIG. 4 shows (purely schematically) an actuator 15 connected to the PLC 4 of the system and which is, in turn, connected to a valve 16 of the system comprising a drive.

During operation, the actuator 15 cyclically receives, from the PLC 4, input values representing manipulated variable values for the actuator 15 that form part of the process image of the outputs PIQ of the PLC 4. These values represent setpoint values. The actuator 15 acts upon the process, in this case the valve 16, in accordance with the manipulated variable values. These events are indicated in FIG. 6 by an arrow from the PIQ of the PLC 4, via the actuator 15, to the valve 16.

The actuator 15 is an actuator with feedback. The actuator 15 accordingly acquires the resulting actual values that arise from the manipulated variable values, which is possible, e.g., using suitable sensor technology, and these are transmitted to the PLC 4. In FIG. 4, this feedback of the actual values is indicated by a line that connects a detection point (provided with the reference character 17) on the valve 16 to the actuator 15 and the PII of the PLC 4. The resulting actual values can be positions of the valve 16, for example. The resulting actual values are also transferred cyclically to the PLC 4 and form part of the process image of the inputs PII of this PLC. The actual values represent status values resulting from the manipulated variable values.

For simulation of the actuator 15, the system model can include an actuator device model 18 for the valve positioner, which can be, e.g., a detailed device model from the SIMIT device library. In the exemplary described embodiments, the positioner model with the designation "Sipart PS2" (corresponding to the actuator 15) from the "SITRANS and SIPART device library for SIMIT SP" is specifically provided, although this is not to be understood in a limiting sense. In addition, a generic device model 19 that replicates the interface of the actuator 15 can be provided for the positioner of the actuator 15.

In FIG. 4, similarly to FIG. 2, the two device models 18, 19 are shown, again in purely schematic form, below the corresponding components of the real system. In addition to the two device models 18, 19, the SoftPLC 9 of the system model and a process simulation 20 associated with the valve 16 are also shown.

As part of the simulation, the SoftPLC 9 cyclically transfers simulated manipulated variable values to the actuator device model 18 and the actuator device model 18 comprises one or more mathematical functions via which state values can be calculated from the simulated manipulated variable values transferred that represent actual values of the valve 16 or more specifically its drive/motor. The simulated manipulated variable values represent real manipulated variable values of the real PLC 4 that represent input values of the real actuator 15.

In the case of a component model of a valve 16, the valve position is predefined for the valve model 20 via the device model 18, 19 as a percentage value from 0 to 100 and the valve position is mapped to a valve characteristic value via a valve characteristic curve.

Figure 5:
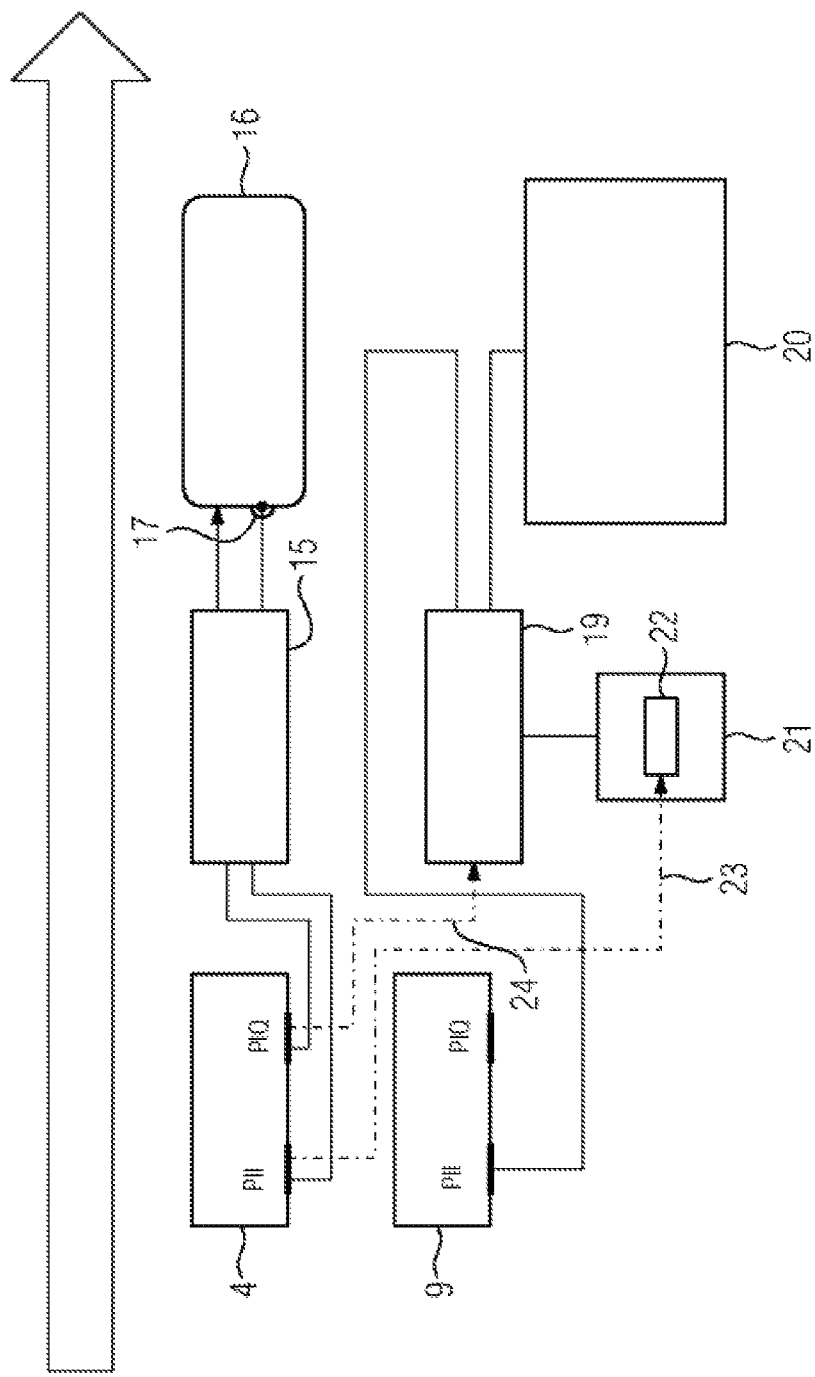
FIG. 5 shows the components and models from FIG. 4, where the actuator device model is constituted by an inventively extended actuator device model.

In accordance with the presently disclosed embodiments of the invention, in step S1 a system model is provided which comprises an extended actuator device model 21 instead of a conventional actuator device model 18 (cf. FIG. 5). The extension 22 is constituted (similarly to the extended transmitter device model 10) by one or more inverse mathematical functions that are the inverse of the mathematical function(s) of the conventional actuator device model 18.

In step S2, at least one value of the process image of the outputs PIQ of the real PLC 4 of the real system is provided, in this case at least one manipulated variable value as a real actuator input value and at least one value of the process image of the inputs PII of the real PLC 4, in this case at least one actual value of the valve 16 associated with the manipulated variable value.

In step S3, the at least one value of the PIQ and the at least one value of the PII of the PLC 4 is transferred to the extended actuator device model 21. This is indicated in FIG. 5 by dash-dotted arrows 23, 24 going from the PIQ or PII of PLC 4 to the extended actuator device model 21.

In step S4, at least one manipulated variable value representing an input value of the actuator 15 is back-calculated from the at least one value of the PII via the one or more inverse functions of the extension 22.

In step S5 an assignment table can be used to allocate at least one correspondence value to the at least one calculated manipulated variable value.

In step S6, if the at least one manipulated variable value calculated using the inverse mathematical functions is at variance with the at least one transferred manipulated variable value which is part of the PIQ of the real PLC 4, then alignment can be brought about.

Using at least one extended actuator device model is particularly suitable if synchronization is to occur at a point in time when the system is in a non-stationary state, since a transient state can be derived from the comparison from setpoint to actual (PIQ to PII).

It should be noted that the inventive synchronization described above can self-evidently also be performed repeatedly, in particular to avoid and/or detect a "divergence" of the real system and the system model following a successful synchronization. The above-described steps can then be repeated at predetermined points in time, for example.

Although the invention has been illustrated and described in detail by the preferred exemplary embodiment, the invention is not limited by the examples disclosed and other variations will be apparent to persons skilled in the art without departing from the scope of protection sought for the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for synchronizing a system model utilized to simulate a real industrial system with a real system, the method comprising:
    a) providing a system model comprising at least one device model which simulates or can simulate operation of a real device of the real industrial system, the at least one device model being configured to, utilizing at least one mathematical function, calculate simulated output values which represent real output values of at least one of (i) the at least one real device and (ii) simulated state values which represent real state values of the real industrial system, from simulated input values representing real input values for the at least one real device, and the at least one device model being extended to include at least one mathematical function which is an inverse of said at least one mathematical function;
    b) providing at least one of (i) at least one real output value and (ii) state value originating from the operation of the real industrial system;
    c) supplying at least one of (i) the at least one real output value and (ii) state value to the extended device model;
    d) utilizing the at least one inverse mathematical function to back-calculate the at least one input value from at least one of (i) the at least one real output value and (ii) state value;
    e) synchronizing at least one of (i) the at least one back-calculated input value and (ii) at least one value derived from the back-calculated at least one input value to synchronize the system model with the real industrial system;
    f) operating the real industrial system while taking into account the synchronized system model.

2. The method as claimed in claim 1, wherein the real industrial comprises a plurality of devices, the method further comprising:
    providing, during step a), a system model comprising a device model for all real devices of the real industrial system which simulates or can simulate operation of each respective real device of the real industrial system, the respective device model being configured to, utilizing the at least one mathematical function, calculate simulated output values which represent at least one of (i) real output values of the at least one real device and (ii) simulated state values which represent real state values of the real industrial system, from simulated input values which represent real input values for the at least one real device, and the respective device model being extended to include at least one mathematical function which is an inverse of the at least one mathematical function of the respective device model; and
    providing, during step b), at least one of (i) at least one real output value and (ii) state value originating from operation of the real industrial system during for at least two devices;
    supplying, during step c), at least one of (i) the respective at least one real output and (ii) state value to the respective extended device model;
    calculating at least one back-calculated input value from at least one of (i) the respective at least one real output and (ii) state value via the at least one inverse mathematical functions of the respective extended device model during step d);
    utilizing at least one of (i) back-calculated input values and (ii) values derived from the back-calculated input values to synchronize the system model with the real industrial system.

3. The method as claimed in claim 2, wherein the at least one extended device model comprises a transmitter device model which is configured to simulate operation of a transmitter of the real industrial system and which processes real input values into real output values.

4. The method as claimed in claim 2, wherein the at least one extended device model comprises an actuator device model which is configured to simulate operation of an actuator of the real industrial system.

5. The method as claimed in claim 4, further comprising:
    providing at least one value of a process image of outputs of a real programmable logic controller of the real system and at least one value of the process image of the inputs of the real programmable logic controller of the real industrial system during step b); and
    back-calculating at least one actuator input value is from the at least one value of the process image of the inputs and compared with the at least one value of the process image of the outputs of the real programmable logic controller of the real system utilizing the inverse mathematical function or functions of the extended actuator device model during step d), alignment being cause in an event of a deviation.

6. The method as claimed in claim 1, further comprising:
    providing at least one real output value acquired on the real industrial system during step b).

7. The method as claimed in claim 1, further comprising:
providing a plurality of real output values during step b);
wherein at least one sequence of a plurality of real output values acquired at successive points in time is provided.

8. The method as claimed in claim 1, further comprising:
providing at least part of at least one of (i) a process image of inputs (PII) and (ii) at least part of a process image of outputs (PIQ) of a programmable logic controller of the real industrial system as at least one real output value during step b).

9. The method as claimed in claim 1, further comprising:
utilizing at least one assignment table and/or characteristic curve to allocate at least one correspondence value to the at least one back-calculated input value calculated during step d); and
supplying the at least one correspondence value to the system model during step e) as a derived value.

10. The method as claimed in claim 1, wherein the at least one extended device model simulates a mode of operation of at least one of (i) scaling, (ii) normalization and (iii) filtering of input values by the real device.

11. A computer program product comprising program code for performing the method as claimed in claim 1.

12. An apparatus comprising:
at least one processor; and
main memory;
wherein the apparatus is configured to:
a) providing a system model comprising at least one device model which simulates or can simulate operation of a real device of a real industrial system, the at least one device model being configured to, utilizing at least one mathematical function, calculate simulated output values which represent real output values of at least one of (i) the at least one real device and (ii) simulated state values which represent real state values of the real industrial system, from simulated input values representing real input values for the at least one real device, and the at least one device model being extended to include at least one mathematical function which is an inverse of said at least one mathematical function;
b) providing at least one of (i) at least one real output value and (ii) state value originating from the operation of the real industrial system;
c) supplying at least one of (i) the at least one real output value and (ii) state value to the extended device model;
d) utilizing the at least one inverse mathematical function to back-calculate the at least one input value from at least one of (i) the at least one real output value and (ii) state value; and
e) synchronizing at least one of (i) the at least one back-calculated input value and (ii) at least one value derived from the back-calculated at least one input value to synchronize the system model with the real industrial system;
wherein the real industrial system is operated while taking into account the synchronized system model.

13. A non-transitory computer-readable medium encoded with program instructions which, when executed by a processor of at least one computer, cause the at least one computer to synchronize a system model utilized to simulate a real industrial system with a real system, the computer program comprising:
a) program code for providing a system model comprising at least one device model which simulates or can simulate operation of a real device of the real industrial system, the at least one device model being configured to, utilizing at least one mathematical function, calculate simulated output values which represent real output values of at least one of (i) the at least one real device and (ii) simulated state values which represent real state values of the real industrial system, from simulated input values representing real input values for the at least one real device, and the at least one device model being extended to include at least one mathematical function which is an inverse of said at least one mathematical function;
b) program code for providing at least one of (i) at least one real output value and (ii) state value originating from the operation of the real industrial system;
c) program code for supplying at least one of (i) the at least one real output value and (ii) state value to the extended device model;
d) program code for utilizing the at least one inverse mathematical function to back-calculate the at least one input value from at least one of (i) the at least one real output value and (ii) state value; and
e) program code for synchronizing at least one of (i) the at least one back-calculated input value and (ii) at least one value derived from the back-calculated at least one input value to synchronize the system model with the real industrial system;
f) program code for operating the real industrial system while taking into account the synchronized system model.

* * * * *